United States Patent
Gilbert

(10) Patent No.: US 8,862,379 B2
(45) Date of Patent: Oct. 14, 2014

(54) VEHICLE COLLISION SHIELD

(75) Inventor: Eric B. Gilbert, Shoreline, WA (US)

(73) Assignee: The Boeing Company, Chicago, IL (US)

(*) Notice: Subject to any disclaimer, the term of this patent is extended or adjusted under 35 U.S.C. 154(b) by 1829 days.

(21) Appl. No.: 10/945,373

(22) Filed: Sep. 20, 2004

(65) Prior Publication Data

US 2006/0064245 A1 Mar. 23, 2006

(51) Int. Cl.
*G08G 1/16* (2006.01)

(52) U.S. Cl.
USPC ........... 701/301; 340/436; 340/901; 342/104; 342/118

(58) Field of Classification Search
CPC ....................................................... G08G 1/16
USPC ............ 701/301; 340/436, 901; 342/104, 118
See application file for complete search history.

(56) References Cited

U.S. PATENT DOCUMENTS

| | | | |
|---|---|---|---|
| 3,814,211 A | 6/1974 | Pamer | |
| 4,931,930 A | 6/1990 | Shyu et al. | |
| 5,004,997 A | 4/1991 | Shisgal et al. | |
| 5,548,515 A | 8/1996 | Pilley et al. | |
| 5,621,807 A * | 4/1997 | Eibert et al. | 382/103 |
| 5,740,047 A | 4/1998 | Pilley et al. | |
| 5,889,479 A | 3/1999 | Tabel | |
| 5,940,012 A | 8/1999 | Studebaker | |
| 6,294,985 B1 | 9/2001 | Simon | |
| 6,462,697 B1 | 10/2002 | Klamer et al. | |
| 7,068,211 B2 * | 6/2006 | Oswald et al. | 342/70 |
| 7,119,716 B2 * | 10/2006 | Horstemeyer | 340/994 |
| 7,456,847 B2 * | 11/2008 | Krajec | 345/629 |
| 2001/0018640 A1 * | 8/2001 | Matsunaga | 701/301 |
| 2002/0032525 A1 * | 3/2002 | Yoshikawa et al. | 701/213 |
| 2003/0033084 A1 * | 2/2003 | Corcoran, III | 701/301 |
| 2003/0122666 A1 | 7/2003 | John et al. | |
| 2003/0201929 A1 * | 10/2003 | Lutter et al. | 342/52 |
| 2003/0227395 A1 * | 12/2003 | Zeineh | 340/988 |
| 2003/0235327 A1 * | 12/2003 | Srinivasa | 382/104 |
| 2004/0019420 A1 * | 1/2004 | Rao et al. | 701/45 |
| 2004/0249571 A1 * | 12/2004 | Blesener et al. | 701/301 |
| 2004/0255297 A1 * | 12/2004 | Horstemeyer | 718/100 |
| 2004/0260439 A1 * | 12/2004 | Endo et al. | 701/36 |
| 2006/0064245 A1 * | 3/2006 | Gilbert | 701/301 |
| 2006/0125644 A1 * | 6/2006 | Sharp | 340/573.1 |
| 2007/0050114 A1 * | 3/2007 | Koike et al. | 701/45 |

FOREIGN PATENT DOCUMENTS

EP 0 690 315 B1 5/2001

* cited by examiner

*Primary Examiner* — Tuan C. To

(57) ABSTRACT

In the present disclosure, systems and methods for preventing collisions between a ground services vehicle and other objects are described. In one embodiment, a system includes a digital three dimensional map of the outer dimensions of the ground vehicle, a micro radar device, a comparator, and an indicator. The micro radar device is secured to the ground vehicle. A comparator signals when an object is within a predetermined envelope around the outer dimensions of the ground vehicle. The comparator receives signals from the micro radar device, and includes dimension data from the three dimensional map. The indicator is responsive to the signal from the comparator. The indicator alerts of possible and pending collision when the predetermined envelope is breached. The indicator may also activate a brake mechanism to stop the ground vehicle. Methods for carrying out the invention by sensing a breach of the envelope and stopping the vehicle are also disclosed.

12 Claims, 2 Drawing Sheets

VEHICLE COLLISION SHIELD

FIELD OF THE INVENTION

This invention relates generally to collision avoidance systems for ground vehicles and, more specifically, to aircraft service ground vehicles with defined movement envelopes and methods for parked aircraft collision avoidance.

BACKGROUND OF THE INVENTION

Commercial aircraft suffer regular damage from service vehicles that collide with them while the aircraft are parked at the gate or other service location. Engine housings are particularly vulnerable. The housings are a particular risk due to their location low to the ground and the expense of the parts. All flight-line vehicles including fuel trucks, ground power carts, baggage trains, cargo loaders, galley services vehicles, and mobile exit ramps pose a collision risk. Not only is the damage expensive to repair, it can affect the dispatch of the aircraft at great cost to the airlines. The damage expense is multiplied with newer aircraft constructed of lighter weight materials such as composites. The dispatch of composite aircraft is more affected by minor collisions than aluminum aircraft, because dispatch based on visual inspection alone may not suffice.

Airborne collision avoidance and even runway collision avoidance has been addressed. These avoidance remedies presume aircraft movement and high-speed collisions. However, slow speed "minor" collision avoidance with a stationary aircraft and a service vehicle has not been adequately prevented due to the reliance on human intervention to avoid a "bump."

Repair and dispatch delay expenses are not the only costs resulting from the risk of such collisions. The aircraft parts that regularly suffer small bumps have been designed tougher and, consequently, heavier in an attempt to withstand some such blows. This extra heavy equipment is more expensive to produce and more expensive to fly.

SUMMARY OF THE INVENTION

The present invention comprises systems and methods for preventing collisions between a ground vehicle and other objects. In one embodiment, a system includes a digital three-dimensional map of the outer dimensions of the ground vehicle, a proximity sensor, a comparator, and a brake mechanism. The proximity sensor is secured to the ground vehicle. The comparator signals when an object is within a predetermined envelope around the outer dimensions of the ground vehicle. The comparator receives signals from the proximity sensor and has dimension data from the three-dimensional map. The brake mechanism is activated by the comparator to engage a ground vehicle brake when the predetermined envelope is breached.

In accordance with one aspect of the invention, the proximity sensor comprises a micro radar device. Alternatively, the proximity sensor includes an ultrasonic sensor. The proximity sensor further detects a direction vector and velocity of the ground vehicle. The activation of the brake mechanism is modified based on the detected velocity.

In accordance with further aspects of the invention, the system is configured for preventing collisions between a ground services vehicle and an aircraft. The proximity sensor includes a global positioning system attached to the ground services vehicle. The system also preferably includes a global positioning system attached to the aircraft, wherein signals from the global positioning systems attached to the ground services vehicle and the aircraft are compared to determine envelope breach. In accordance with a further aspect of the invention, a digital three-dimensional map of the aircraft is useable by the comparator to help determine the envelope breach.

In accordance with still further aspects of the invention, the brake mechanism is switched for activation by the comparator only within a defined territory. A speed governor is also used. The governor is coupled to the ground services vehicle and activated within the defined territory.

The present invention also includes a method of vehicle collision avoidance. In one embodiment, a method includes providing a three dimensional description of the geometry of a vehicle to a processor, sensing the proximity of other objects to the vehicle, and signaling a breach of a predetermined envelope around the vehicle. The proximity sensing is conducted when the vehicle is in motion. It may be sensed with a micro radar device by comparing the radar signals to the three-dimensional description of the vehicle. A breach of a predetermined envelope is signaled with the vehicle approaches within a predetermined distance of another object.

In accordance with another aspect of the invention, the method further includes engaging a brake to stop the vehicle upon receipt of a signal indicating a breach of the predetermined envelope. The method may further comprise sensing the vehicle proximity to the gate area of an airport. The brakes are thus engaged responsive to the signal only within the predetermined proximity to the gate area. The sensing of the vehicle proximity to the gate area preferably comprises receiving a global positioning system signal of the vehicle location.

In accordance with a further aspect of the invention, the method further includes sensing the speed of the vehicle. The definition of the predetermined envelope changes depending upon the speed sensed.

In accordance with further aspects of the invention, a system for preventing collisions between and aircraft ground services vehicle and an aircraft includes a processor, a proximity sensor, and a brake controller. The processor is attached to the ground services vehicle. The processor stores the three dimensional map of the ground services vehicle outer geometry. The proximity sensor is attached to the ground services vehicle as well. The proximity sensor feeds a signal to the processor indicative of the position of the aircraft in the immediate vicinity of the ground services vehicle. The brake controller is activated by the processor to engage brakes on the ground services vehicle when the aircraft is within a predetermined distance from any part of the ground services vehicle.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to vehicle collision avoidance systems and methods. Many specific details of certain embodiments of the invention are set forth in the following description and in FIGS. 1-4 to provide a thorough understanding of such embodiments. One skilled in the art, however, will understand that the present invention may have additional embodiments, or that the present invention may be practiced without several of the details described in the following description.

Figure 1:
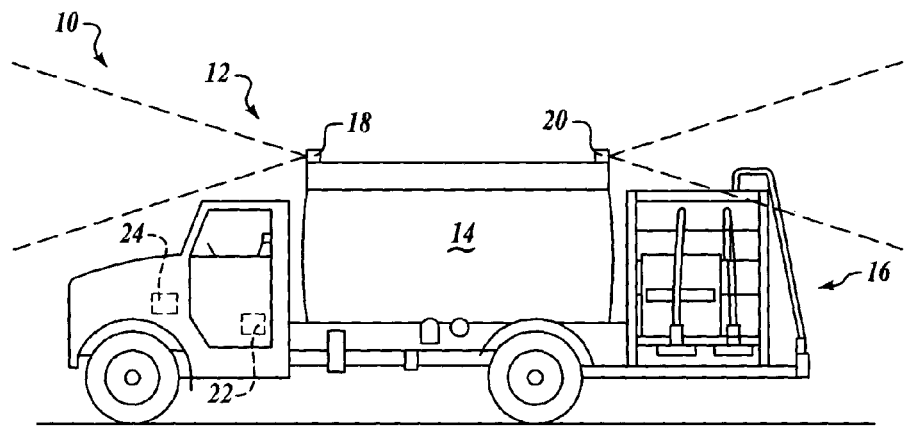
FIG. 1 is a perspective view of a ground services vehicle equipped with the protection systems of the present invention.

Referring to FIG. 1, a ground services vehicle in the form of a fuel truck 10 utilizing the present invention will be described. Fuel truck 10 includes a body 12 including a cab and engine compartment at the forward end of the vehicle. A tank 14 is held on the chassis of the truck with an outer appliance 16 secured to the aft end of the truck. Such appliances may include pumps, hoses, or other apparatus to service aircraft. Fuel truck 10 is simply an illustrative example of a ground services vehicle. There are many examples of ground services vehicles that regularly approach very close to airplanes at aircraft terminals. These vehicles may have various sizes, shapes, and complexities. Such vehicles may include baggage trains, conveyer belt vehicles, galley supply vehicles, and other service vehicles.

In this embodiment, a micro radar device is secured to fuel truck 10. Preferably, such a device includes a forward radar unit 18 and an aft radar unit 20. Such radar units 18 and 20 are directionally aimed to detect aircraft proximity in all directions of movement of fuel truck 10. Thus, aft radar unit 20 is directed rearwardly for detection when fuel truck 10 is in a reverse direction relative to an aircraft. Forward radar unit 18 is for a forward direction of the vehicle. Both such radar units 18 and 20 include a wide span of "vision" to account for turning of fuel truck 10 as it travels. Other proximity sensors may be used in alternate embodiments of the invention.

FIG. 1 also schematically illustrates the general placement of a processor 22 that provides a comparator function to determine impending collision situations between fuel truck 10 and an aircraft. A brake actuator 24 is also illustrated. Once receiving a signal from processor 22 of a near collision situation, brake actuator 24 is activated to stop fuel truck 10 prior to any such collision. In one embodiment, proximity sensors not only calculate distance from the aircraft, but also a velocity vector, calculating speed and direction. Such velocity vector information may be fed into the processor 22 such that the brakes are applied earlier or in graduated degrees depending on the speed of the vehicle. Directional data helps determine whether or not brake actuator 24 is engaged. Brake actuator 24 may apply brakes separately from the standard vehicle brakes or may simply be an actuator to apply the standard vehicle brakes to slow or stop the vehicle.

Figure 2:
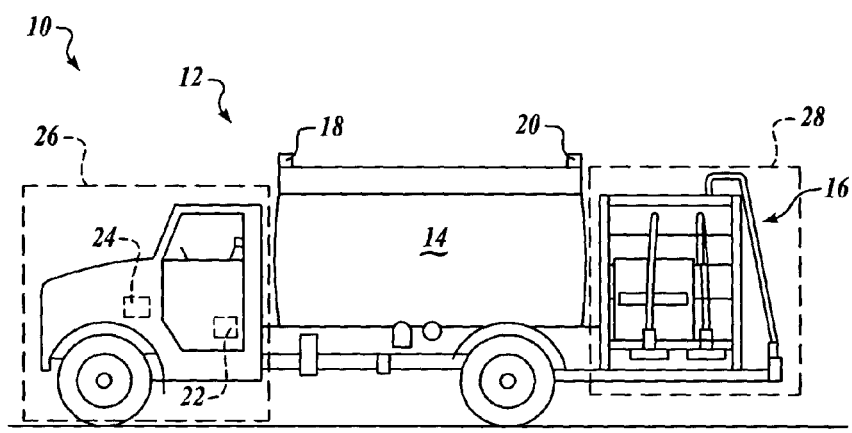
FIG. 2 is the same ground services vehicle showing the various space envelopes.
Figure 3:
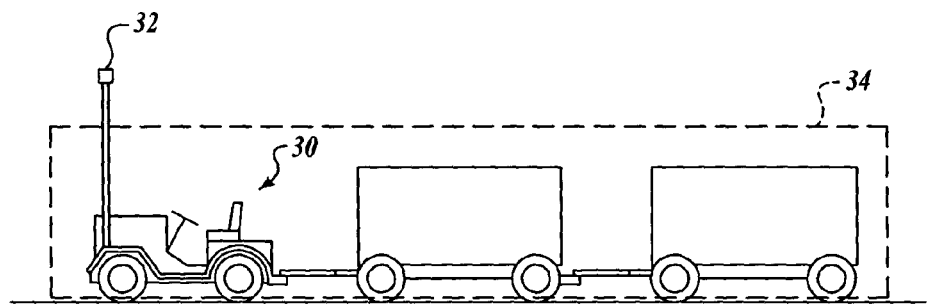
FIG. 3 is a baggage train tug showing a radar element on top of a small tower.

A further aspect of the invention is illustrated in FIG. 2. Processor 22 of fuel truck 10 includes data specific to fuel truck 10 regarding the space envelope of the fuel truck 10. Thus, a 3-D map of the various portions of fuel truck 10 may be fed into processor 22 such that it may function as a comparator between the space envelopes and the data received from radar units 18 and 20. Thus, a vehicle forward space envelope 26 with the data from the three-dimensional configuration of body 12 may be stored in processor 22. The three-dimensional space envelope 28 of the aft portion of fuel truck 10 is also stored in processor 22. These are the portions of the vehicle that are most likely to collide with an aircraft. Alternatively, the entire vehicle space envelope may be stored in processor 22.

With the 3-D configuration of fuel truck 10 stored in processor 22, once proximity sensors, such as radar units 18 and 20, detect an aircraft part in close proximity to the space envelopes, processor 22 signals brake actuator 24 to slow or stop fuel truck 10. Thus, an expensive collision may be avoided. As is apparent from the figures, it may be difficult for the driver of fuel truck 10, or the driver of any other ground services vehicle to see the aircraft components or to see the various apparatuses, that may be appurtenant to such ground services vehicle. Therefore, the sensors and comparators of the present invention will help the vehicle driver by sounding an alarm or activating a brake mechanism. The terminal areas of the airport may be quite noisy such than an audible alarm may be less effective than desired. The visual alarm may also be less effective than desired as it depends upon the vehicle operator viewing a certain direction. Furthermore, the slow speeds usually attendant to such areas of an aircraft terminal may allow for brakes to be automatically applied without excessive fear of operator injury.

Speed governors may also be employed within a terminal area of an aircraft to limit the overall speed of the ground services vehicle such that when the brakes are applied to avoid a collision, the speed reduction is not excessive.

Returning to FIG. 3, a tug with a baggage train is illustrated. Tug 30 includes a radar tower 32 secured to the front thereof such that the radar can "see" the baggage train behind the tug and other obstacles including aircraft. Alternatively, or additionally, the space envelope 34 of tug 30 may be expanded automatically with the processor based on how many baggage cars are secured to tug 30.

Figure 4:
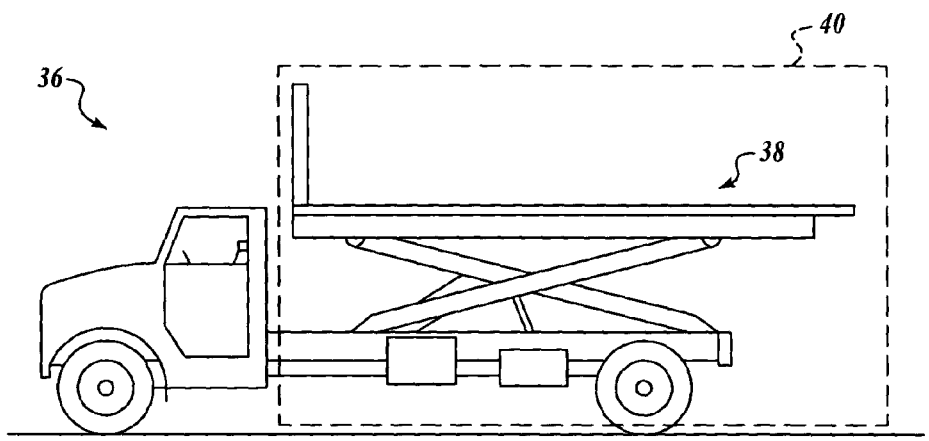
FIG. 4 illustrates a perspective view of a lift-bed truck illustrating the expanding space envelope.

In one embodiment, expansion of the space envelope is automatically employed or manually employed in the case of a vehicle that includes removable components such as that illustrated with a lift truck 36 of FIG. 4. Lift truck 36 includes a lift bed 38 that may be used for loading supplies onto aircraft. The processor preferably includes three-dimensional configuration data of lift truck 36. Such data includes provision for expanding the space envelope as the scissors lift on a lift bed 38 is extended. Thus, an expandable envelope 40 is programmed into the processor. Sensors are preferably applied to the lift mechanism or to the bed to indicate to the processor the extension of the bed.

An alternate way of carrying out the invention includes the use of GPS units on the ground services vehicle with GPS unit on the aircraft. Both the ground services vehicle and the aircraft can signal to a comparator either at the terminal or on the ground services vehicle, which can then activate the brake mechanism. The aircraft three-dimensional map may also be programmed into the processor or comparator for each specific aircraft to which the ground services vehicle is assigned. With the GPS signals and the three-dimensional maps, the comparator can determine the proper space envelopes and when such envelopes may be potentially breached. With the GPS or other location signal aboard the ground services vehicle, a territory switch may also be applied to reduce the likelihood of false actuation of the brake mechanism. Thus, the territory switch would allow the brake mechanism to be activated only, for example, in the terminal area of the airport. Furthermore, an airport-wide anti-collision system could be employed with GPS units on aircraft and ground services vehicles sending signals to a processor which then compares the space envelopes and velocity vectors.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for preventing collisions between a ground vehicle and a stationary aircraft, the vehicle including movable elements that change the outer geometry of the vehicle, the system comprising:
    a digital map of the three-dimensional outer dimensions of the ground vehicle, said map changing to describe any changes in the geometry of the vehicle;
    a proximity sensor secured to the ground vehicle;
    a comparator that signals when the aircraft is within a predetermined envelope around the outer dimensions of the ground vehicle, said comparator receiving signals from said proximity sensor and having dimension data from said digital map; and
    a brake mechanism activated by said comparator to automatically engage a ground vehicle brake when the predetermined envelope is breached.

2. The system of claim 1, wherein said proximity sensor comprises a micro-radar device.

3. The system of claim 1, wherein said proximity sensor comprises an ultrasonic sensor.

4. The system of claim 1, wherein the brake mechanism is switched for activation by the comparator only within a defined territory.

5. The system of claim 4, further comprising a speed governor coupled to the ground services vehicle, said speed governor being activated with the defined territory.

6. A system for preventing collisions with an aircraft ground-services vehicle, the system comprising:
    a processor attached to the ground-services vehicle, said processor storing a three-dimensional map of the ground-services vehicle outer geometry, said three-dimensional map modifiable upon in-use changes to the 3-D geometry of the ground-services vehicle; and
    a proximity sensor attached to the ground-services vehicle, said proximity sensor feeding a signal to said processor;
    wherein the processor uses the three-dimensional map and the sensor signal to determine whether a predetermined 3-D envelope around the vehicle has been breached, and notifies the vehicle of a breach.

7. The system of claim 6, further comprising a territory switch that allows the system to fully function to engage the brakes only when the ground-services vehicle is in pre-designated aircraft terminal gate areas.

8. The system of claim 7, wherein said territory switch comprises a global positioning system receiver on said ground-services vehicle.

9. The system of claim 7, wherein said territory switch comprises an airport-based network, said network mapping multiple ground-service vehicles and aircraft.

10. The system of claim 6, wherein said proximity sensor comprises a global positioning system coupled to the ground-services vehicle; the system further comprising a global positioning system coupled to an aircraft, signals from both global positioning systems being received by said processor to determine distance between the ground-services vehicle and the aircraft.

11. The system of claim 10, wherein said processor stores a map of the aircraft outer geometry, the geometry information from the ground-services vehicle and the aircraft being usable by the processor along with the signal from the proximity sensor to determine the distances between the vehicle and the aircraft.

12. The system of claim 6, wherein said processor receives signals of vehicle geometry changes in use, said processor modifying said three-dimensional map upon receiving the geometry changes.

* * * * *